United States Patent [19]
Cheng et al.

[11] Patent Number: 6,092,063
[45] Date of Patent: *Jul. 18, 2000

[54] MULTI-LEVEL LIVE CONNECTION FOR FAST DYNAMIC ACCESS TO BUSINESS DATABASES THROUGH A NETWORK

[75] Inventors: Josephine M. Cheng; HongHai Shen; Jian Xu, all of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/977,038

[22] Filed: Nov. 25, 1997

[51] Int. Cl.⁷ ....................................... G06F 17/30
[52] U.S. Cl. ................... 707/2; 707/6; 707/103
[58] Field of Search .................. 707/103, 2, 4, 707/513, 10, 6, 8; 395/200.09, 472

[56] References Cited

U.S. PATENT DOCUMENTS

| | | | |
|---|---|---|---|
| 5,457,794 | 10/1995 | Azumatani et al. | 707/2 |
| 5,596,745 | 1/1997 | Lai et al. | 707/103 |
| 5,611,049 | 3/1997 | Pitts | 395/200.09 |
| 5,666,546 | 9/1997 | Donnan | 395/472 |
| 5,787,414 | 7/1998 | Miike et al. | 707/2 |
| 5,819,301 | 10/1998 | Rowe et al. | 707/513 |
| 5,860,069 | 1/1999 | Wright | 707/4 |
| 5,983,227 | 11/1999 | Nazem et al. | 707/10 |

OTHER PUBLICATIONS

Netscape Communications Corporation, Internet article, http://partner.netscape.com/compro...t/livewiredatasheet.hmtl, "Netscape LiveWire and LiveWire Pro 1.0 Data Sheet", 1997 (entire document).

IBM Corporation, Internet article, http://www.spi.org/cgi-bin/newqry?...ec=1&submit=seeit&csum=18826721312, Software Patent Institute Database of Software Technologies, Record Display, Record 1, Oct. 1993 (entire document).

IBM Corporation, Internet article, http://www.spi.org/cgi-bin/newqry?...ec=2&submit=seeit&csum=15530556530, Software Patent Institute Database of Software Technologies, Record Display, Record 2, Oct. 1993 (entire document).

IBM Corporation, Internet article, http://www.spi.org/cgi-bin/newqry?...ec=3&submit=seeit&csum=19040413486, Software Patent Institute Database of Software Technologies, Record Display, Record, 2 Oct. 1993 (entire document).

*Primary Examiner*—Wayne Amsbury
*Assistant Examiner*—Thuy Pardo
*Attorney, Agent, or Firm*—Pretty, Schroeder & Poplawski, P.C.

[57] ABSTRACT

A method, apparatus, and article of manufacture for a computer-implemented live connection manager. A statement is executed in a computer to retrieve data from a database stored on a data storage device connected to the computer. In particular, a first statement is received from another computer via an internet network. The first statement is prepared to create an executable structure for executing the first statement. A second statement is received from another computer via an internet network. Then, when the received second statement or portion thereof is the same as the first statement or portion thereof, processing the second statement or portion thereof by executing the executable structure created for the first statement or portion thereof.

42 Claims, 7 Drawing Sheets

MULTI-LEVEL LIVE CONNECTION FOR FAST DYNAMIC ACCESS TO BUSINESS DATABASES THROUGH A NETWORK

BACKGROUND OF THE INVENTION

1. Field of the Invention

This invention relates in general to computer-implemented database systems, and, in particular, to multi-level live connection for fast dynamic access to business databases through a network.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

RDBMS software using a Structured Query Language (SQL) interface is well known in the art. The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

The definitions for SQL provide that a RDBMS should respond to a particular query with a particular set of data given a specified database content, but the method that the RDBMS uses to actually find the required information in the tables on the disk drives is left up to the RDBMS. Typically, there will be more than one method that can be used by the RDBMS to access the required data. The RDBMS will optimize the method used to find the data requested in a query in order to minimize the computer time used and, therefore, the cost of doing the query.

The RDBMS software uses various data, including statistics in a RDBMS catalog, during bind time to determine the access paths of SQL statements. A utility, called RUNSTATS, updates the RDBMS catalog with statistics on table spaces, indexes, tables, and columns. Additionally, when an SQL statement is processed during a bind phase, an access path is determined for the statement. The access path is a compiled run-time structure used for executing the SQL statement. The access path is the path the RDBMS uses to get to the data that SQL statements request. For example, an SQL statement might search an entire table space, or it might use an index. The data associated with the access path is stored in the catalog, or optionally in a plan table.

The Internet is a collection of computer networks that exchange information via Transmission Control Protocol/Internet Protocol ("TCP/IP"). The Internet consists of many internet networks, each of which is a single network that use the TCP/IP protocol suite. Currently, the use of the Internet for commercial and non-commercial uses is exploding. Via its networks, the Internet enables many users in different locations to access information stored in databases stored in different locations.

The World Wide Web (also known as "WWW" or the "Web") is a facility on the Internet that links documents. The Web is a hypertext information and communication system used on the Internet computer network with data communications operating according to a client/server model. Typically, Web clients will request data stored in databases from Web servers, which are connected to the databases. The Web servers will retrieve the data and transmit the data to the clients. With the fast growing popularity of the Internet and the Web, there is also a fast growing demand for Web access to databases.

The Web operates using the HyperText Transfer Protocol (HTTP) and the HyperText Markup Language (HTML). This protocol and language results in the communication and display of graphical information that incorporates hyperlinks. Hyperlinks are network addresses that are embedded in a word, phrase, icon or picture that are activated when the user selects a highlighted item displayed in the graphical information. HTTP is the protocol used by Web clients and Web servers to communicate between themselves using these hyperlinks. HTML is the language used by Web servers to create and connect together documents that contain these hyperlinks.

An intranet is an inhouse Web site that serves the employees of an enterprise. Although intranet pages may link to the Internet, an intranet is not a site accessed by the general public.

In conventional systems, a client typically sends a request (i.e., a SQL statement) to a server to access data in a database. A RDBMS at the server processes the SQL statement. The processing includes preparing (i.e., a step in optimizing the execution of the SQL statement) and describing (i.e., a step in optimizing involving processing clauses in the SQL statement) the SQL statement. After processing, the RDBMS executes the SQL statement to retrieve data from a database. The RDBMS then transmits the retrieved data to the client. When the RDBMS at the server receives another SQL statement from the client, the RDBMS prepares, describes, and executes that SQL statement. When the SQL statements are the same or similar, it is inefficient for the RDBMS to prepare, describe, and execute each SQL statement independently.

There is a need in the art for an improved technique for processing SQL statements between clients and servers connected by an Internet or an Intranet.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented live connection manager.

In accordance with the present invention, a statement is executed in a computer to retrieve data from a database stored on a data storage device connected to the computer. In particular, a first statement is received from another computer via a network, for example, an internet or intranet network. Hereinafter, references to internet and intranet are interchangeable to the extent that the present invention is applicable to both types of networks, however, for illustration purposes only, an internet example will be discussed below. The first statement is prepared to create an executable structure for executing the first statement. A second statement is received from another computer via the network. Then, when the received second statement or a portion thereof is the same as the first statement or a portion thereof, the second statement or portion thereof is processed by executing the executable structure created for the first statement or portion thereof.

An object of the invention is to provide more efficient connections to databases across a network. Another object of the invention is to provide more efficient preparation of SQL statements. Yet another object of the invention is to provide more efficient descriptions of SQL statement clauses.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
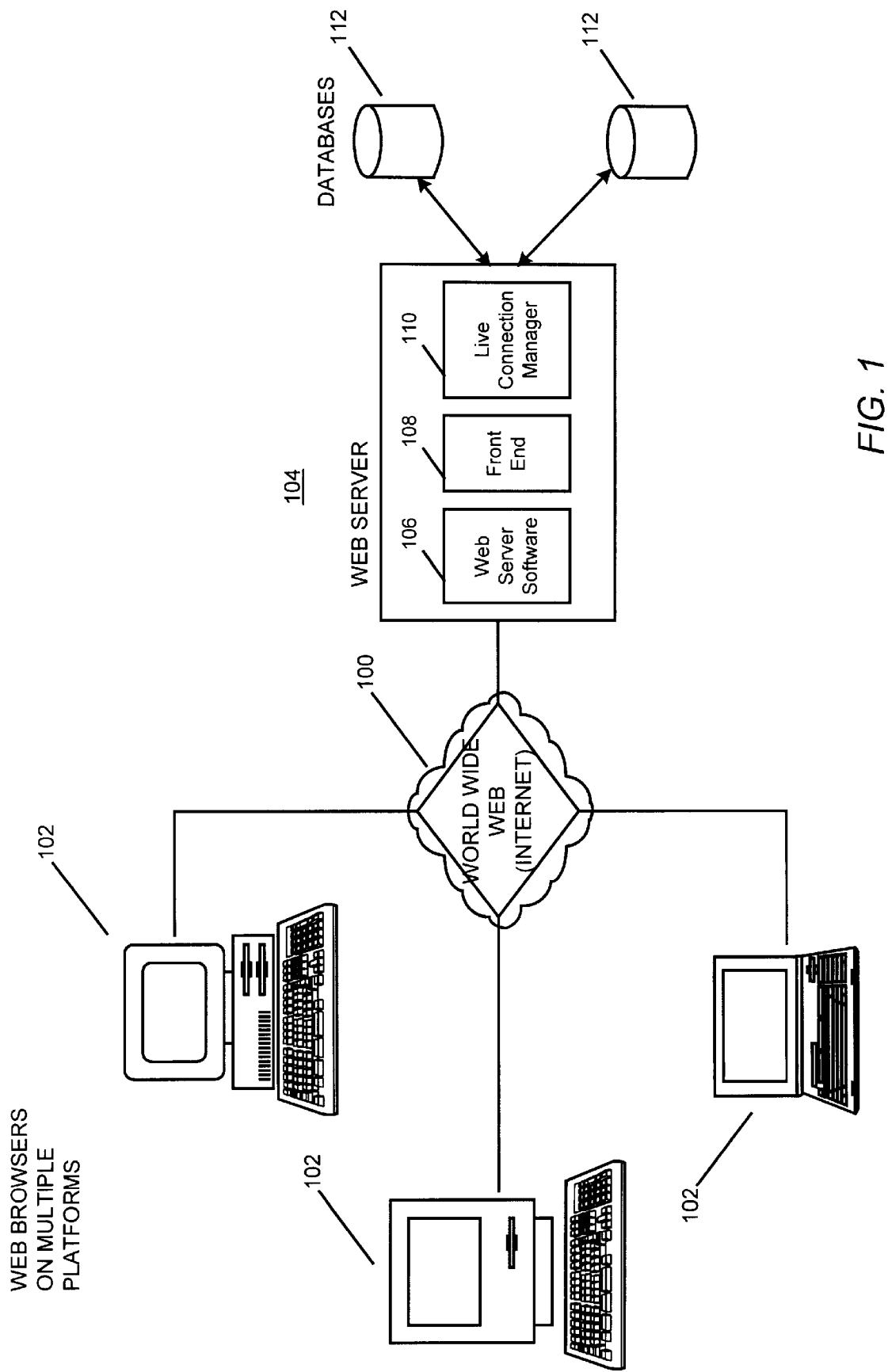
FIG. 1 schematically illustrates the hardware environment of the preferred embodiment of the present invention.

FIG. 1 schematically illustrates the hardware environment of the preferred embodiment of the present invention, and more particularly, illustrates a typical distributed computer system using the Internet 100 to connect client computers 102 executing Web browsers to Web server computers 104 executing Web server software (i.e., Web daemons) 106, a front end 108, and a live connection manager 110, and to connect the Web server system 104 to databases 112. A typical combination of resources may include client computers 102 that are personal computers or workstations, and a Web server computer 104 that is a personal computer, workstation, minicomputer, or mainframe. These systems are coupled to one another by various networks, including LANs, WANs, SNA networks, and the Internet.

A client computer 102 typically executes a Web browser and is coupled to a Web server computer 104 executing Web server software 106. The Web browser is typically a program such as IBM's Web Explorer or NetScape or Mosaic. The Web server software is typically a program such as IBM's HTTP Daemon or other WWW daemon. The Web server computer 104 also executes a live connection manager 110 along with a front end 108 to the live connection manager. The client computer 102 is bi-directionally coupled with the Web server computer 104 over a line or via a wireless system. In turn, the Web server computer 104 is bi-directionally coupled with databases 112.

The live connection manager software supports access to a database 112 by executing RDBMS software. The live connection manager software 110 may be located on the same server as the Web server computer 104 or may be located on a separate machine. The databases 112 may be geographically distributed. The front end 108 to the live connection manager 110 translates the data request received from a Web browser into a SQL statement that can be processed by the live connection manager 110 to retrieve data from databases 112.

Those skilled in the art will recognize many modifications may be made to this configuration without departing from the scope of the present invention.

Figure 2:
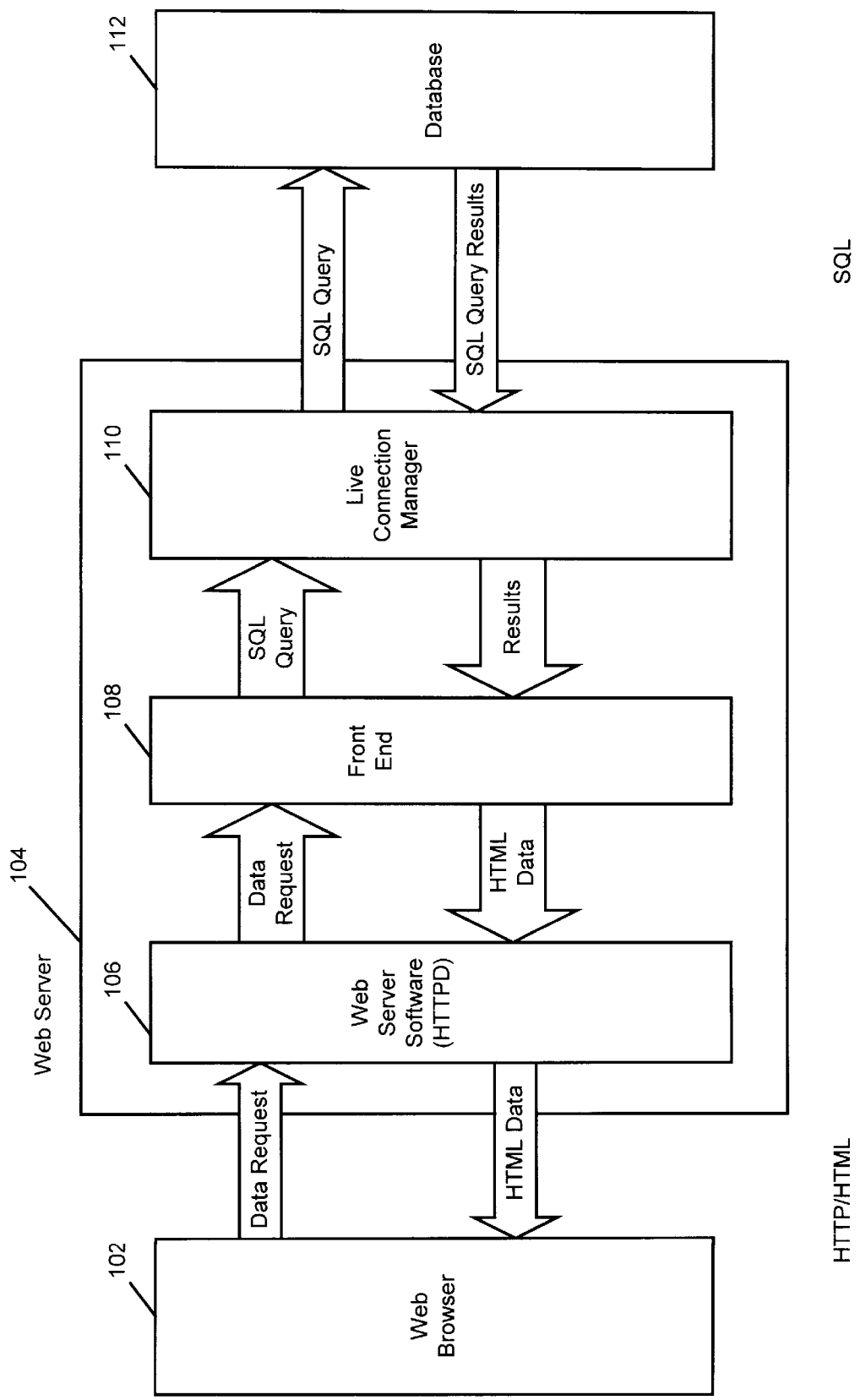
FIG. 2 schematically illustrates an overview of the preferred embodiment of the present invention, and in particular, shows the interaction among components in the present invention.

FIG. 2 schematically illustrates an overview of the preferred embodiment of the present invention, and in particular, shows the interaction among components in the present invention. The user interacts with the Web browser executing on a client computer 102 remotely located from the Web server computer 104. At some point, the user executes an HTTP command (i.e., data request) via the Web browser 102 that results in communication with an HTTP daemon (HTTPD) 106 (i.e., Web server software) executing on the Web server computer 104. The Web server software 106 transmits the data request to the front end 108, which translates the data request received in HTTP to a SQL query that the live connection manager 110 can process. The live connection manager 110 will then process the SQL query and retrieve data (i.e., SQL query results) from the database 112. The data is transmitted from the live connection manager 110 to the front end 108. The front end 108 translates the data results into HTML data for transmission to the Web server software 106. In turn, the Web server software 106 will transmit the HTML data to the Web browser for display at the client computer 102. It is envisioned that the Web server 104 conforms to the Common Gateway Interface (CGI) defined for Web servers, and thus can be invoked from an HTML page in one of two ways: either by an HTTP anchor reference or by an HTTP form action.

SQL Statement Processing

Figure 3:
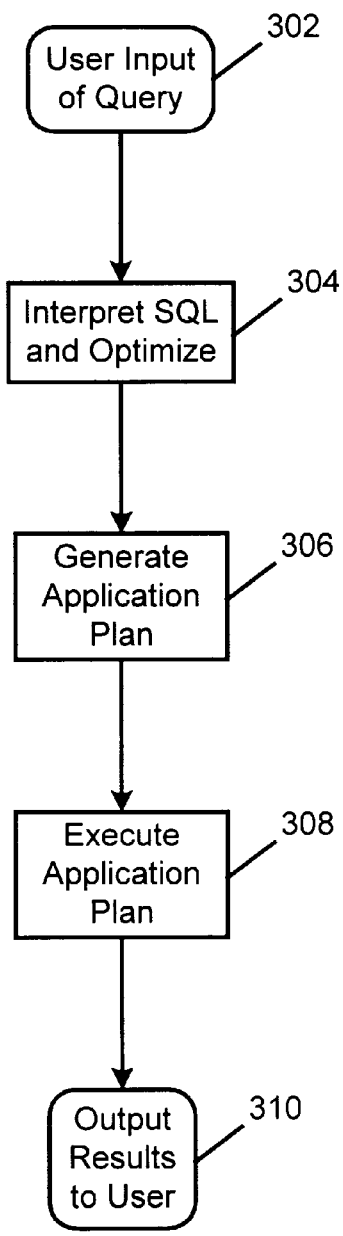
FIG. 3 is a flowchart illustrating the steps necessary for the interpretation and execution of SQL statements in an interactive environment according to the present invention.

FIG. 3 is a flowchart illustrating the steps necessary for the interpretation and execution of SQL statements in an interactive environment according to the present invention. Block 302 represents the input of SQL statements into the computer system 102 from the user. Block 304 represents the step of compiling or interpreting the SQL statements. An optimization function within block 304 may transform the SQL query in a manner described in more detail later in this specification. The optimization function includes prepare and describe functions that prepare the SQL statement and describe the clauses in the SQL statement prior to execution of the SQL statement. Block 306 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 308 represents the execution of the application plan, and block 310 represents the output of the results of the application plan to the user.

Figure 4:
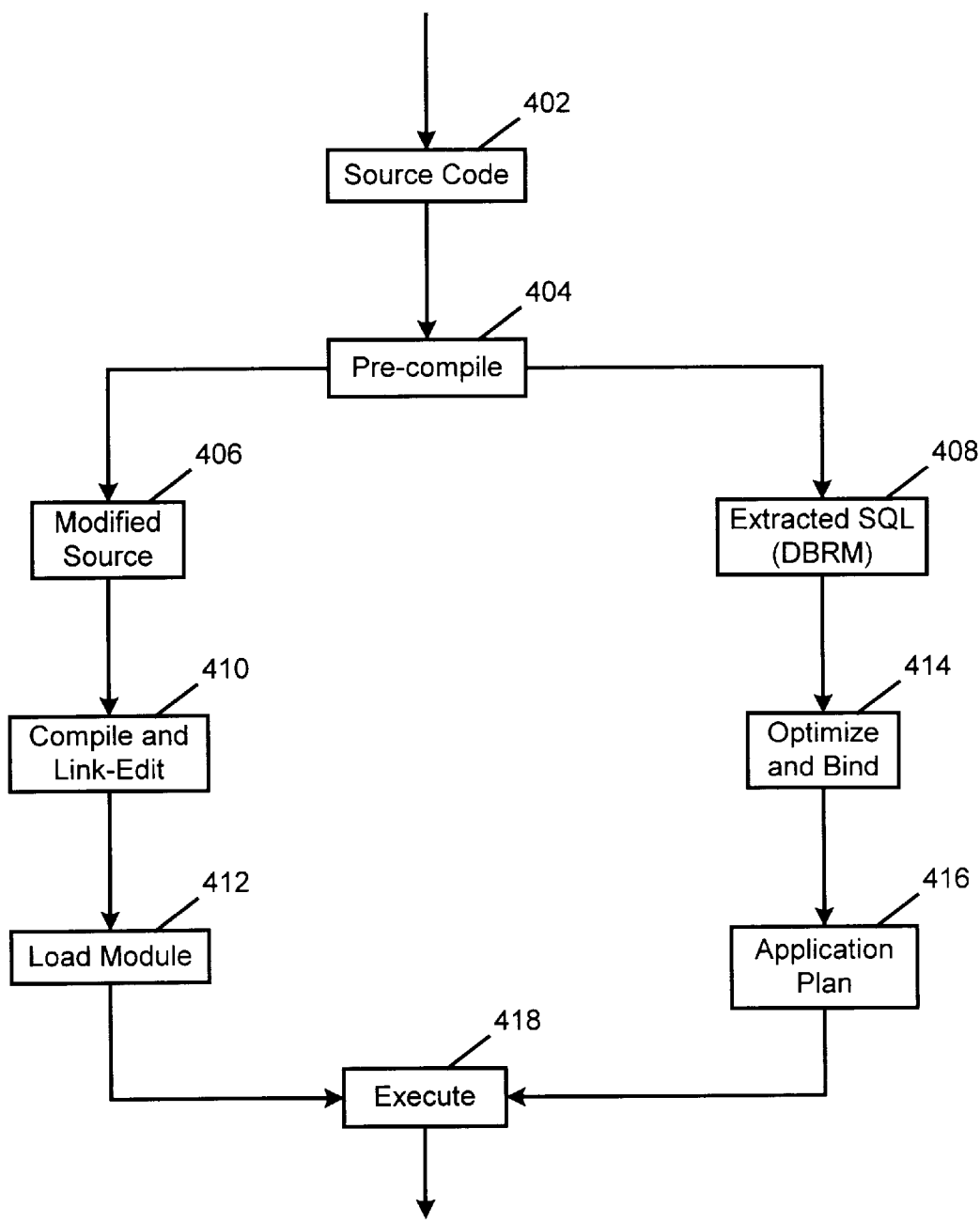
FIG. 4 is a flowchart illustrating the steps necessary for the interpretation and execution of SQL statements embedded in source code according to the present invention.

FIG. 4 is a flowchart illustrating the steps necessary for the interpretation and execution of SQL statements embedded in source code according to the present invention. Block 402 represents program source code containing a host language (such as COBOL or C) and embedded SQL statements. The program source code is then input to a pre-compile step 404. There are two outputs from the pre-compile step 404: a modified source module 406 and a Database Request Module (DBRM) 408. The modified source module 406 contains host language calls to DB2, which the pre-compile step 404 inserts in place of SQL statements. The DBRM 408 consists of the SQL statements from the program source code 402. A compile and link-edit step 410 uses the modified source module 406 to produce a load module 412, while an optimize and bind step 414 uses the DBRM 408 to produce a compiled set of runtime structures for the application plan 416. As indicated above in conjunction with FIG. 3, the SQL statements from the program source code 402 specify only the data that the user wants, but not how to get to it. The optimize and bind step 414 may reorder the SQL query. Thereafter, the optimize and bind step 414 considers both the available access paths (indexes, sequential reads, etc.) and system held statistics on the data to be accessed (the size of the table, the number of distinct values in a particular column, etc.), to choose what it considers to be the most efficient access path for the query. The load module 412 and application plan 416 are then executed together at step 418.

The Multi-Level Live Connection Manager

The present invention provides a live connection manager 110 for maintaining multiple levels of connections. The live connection manager 110 provides fast dynamic access to business databases through the Internet. The live connection manager 110 avoids frequent and expensive database connections. Moreover, the live connection manager 110 avoids unnecessary SQL statement preparation and description. Another advantage of the present invention is that the live connection manager 110 provides dynamic access to heterogeneous database and language environments.

The live connection manager 110 targets three levels of information that improve access to databases across the Internet. First, the live connection manager 110 maintains database connections to avoid reconnections to databases. Since database connections are typically frequent, the live connection manager 110 is advantageous in avoiding costly reconnections.

Second, the live connection manager 110 stores SQL statement preparation results. In this manner, when an SQL statement is received that has the same textual form as an already prepared SQL statement or portion thereof, the live connection manager 110 uses the stored preparation results of the already prepared SQL statement or portion thereof and avoids the costly preparation associated with processing SQL statements.

Third, the live connection manager 110 stores SQL statement description results for WHERE clauses. If an SQL statement is received that is the same as an already processed SQL statement except for the column values for columns in their WHERE clauses, then the live connection manager 110 will use the stored description results from the already processed SQL statement to process the received SQL statement. Again, this avoids costly preparation for the SQL statement.

Database Connections

The live connection manager 110 can establish database pre-connections to improve the performance of database access across the Internet. The live connection manager 110 pre-connects to databases that are identified in a configuration file when the live connection manager 110 is initially invoked. The live connection manager 110 will pre-connect to databases based on a user identity specified in the configuration file. The live connection manager 110 then stores the database connection information identified by user identity (e.g., a user identifier and a password combination). The database connection information provides the live connection manager 110 with the ability to access the database. When the same user accesses a database to which the live connection manager 110 pre-connected, the live connection manager 110 uses the stored database connection information to access the database, thus avoiding a need to reconnect to the database.

The live connection manager 110 improves the performance of database access across the Internet by about 30%. On the other hand, conventional systems typically disconnect from databases without saving connection information. Then, each time a database access is required, the conventional systems perform the time-consuming conventional steps of reconnecting to the database.

Figure 5:
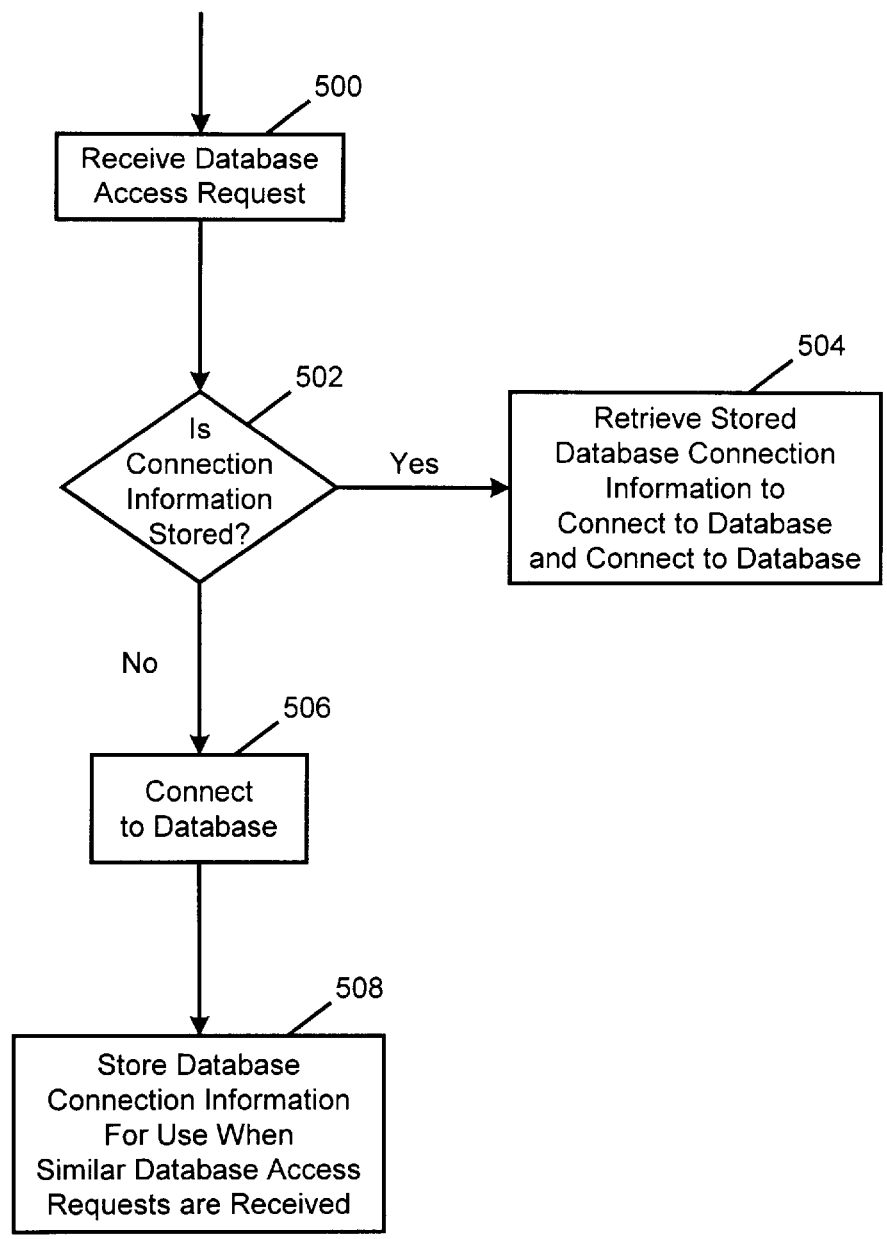
FIG. 5 is a flow chart that illustrates the steps performed by the live connection manager to maintain a database connection.

FIG. 5 is a flow chart that illustrates the steps performed by the live connection manager 110 to maintain a database connection. In Block 500, the live connection manager 110 receives a database access request. In Block 502, the live connection manager 110 determines whether connection information for connecting to the database is stored. When the connection information is stored, the live connection manager 110 continues at Block 504, otherwise, the live connection manager 110 continues at Block 506. In Block 504, the live connection manager 110 retrieves stored database connection information to connect to the database and then connects to the database. In Block 506, the live connection manager 110 connects to a database. In Block 508, the live connection manager 110 saves database connection information for use when similar database access requests are received.

SQL Statements

Additionally, because 30% of the access time is spent on the preparation and description of the SQL statement, the live connection manager 110 stores SQL statement preparation and description results to avoid preparing and describing similar SQL statements repeatedly. When the live connection manager 110 receives a new SQL statement, the live connection manager 110 parses the SQL statement and breaks the SQL statement into phases for statement preparation and description. The live connection manager 110 saves the break down for later reuse.

The live connection manager 110 prepares the SQL statement. Then, the live connection manager 110 saves the results of the preparation in an internal table. Later, when another SQL statement is received the live connection manager 110 determines whether the SQL statement or portion thereof is the same as an SQL statement or portion thereof that has already been prepared. When a first and second statement or portions thereof are the same, and the live connection manager 110 has already prepared the first statement or portion thereof, the live connection manager 110 does not need to prepare the second statement or portion thereof. Instead, the live connection manager 110 will process the second statement or portion thereof by executing the preparation results from preparing the first statement or portion thereof. Next, the live connection manager 110 will retrieve data using this processed statement. In this manner, the live connection manager 110 provides an additional 30% improvement in efficiency by reducing the time required to process SQL statements.

The following sample SQL statements are executed using the same preparation results:
SELECT state FROM EMPLOYEE;
SELECT state FROM EMPLOYEE;

The sub-SELECT portions of the following sample SQL statements are executed using the same preparation results:
SELECT * FROM EMPLOYEE
   WHERE EMP_LEVEL>
     (SELECT AVG(EMP_LEVEL)FROM EMPLOYEE)
SELECT EMP_NAME FROM EMPLOYEE
   WHERE EMP_LEVEL>
     (SELECT AVG(EMP_LEVEL)FROM EMPLOYEE)

The live connection manager 110 maintains an internal table with information for each database. The internal tables include the database name, the user names, user passwords, and other information. Additionally, the live connection manager 110 stores handles (i.e., pointers) to prepared statements in its internal tables. The live connection manager 206 stores connection information, preparation results, and description results in the table. Additionally, a user can define how many prepared statements are to be stored in the table (i.e., an upper limit). When a user specifies an upper limit, when the number of prepared statements reaches the upper limit, then older information in the table is replaced by new information.

Figure 6:
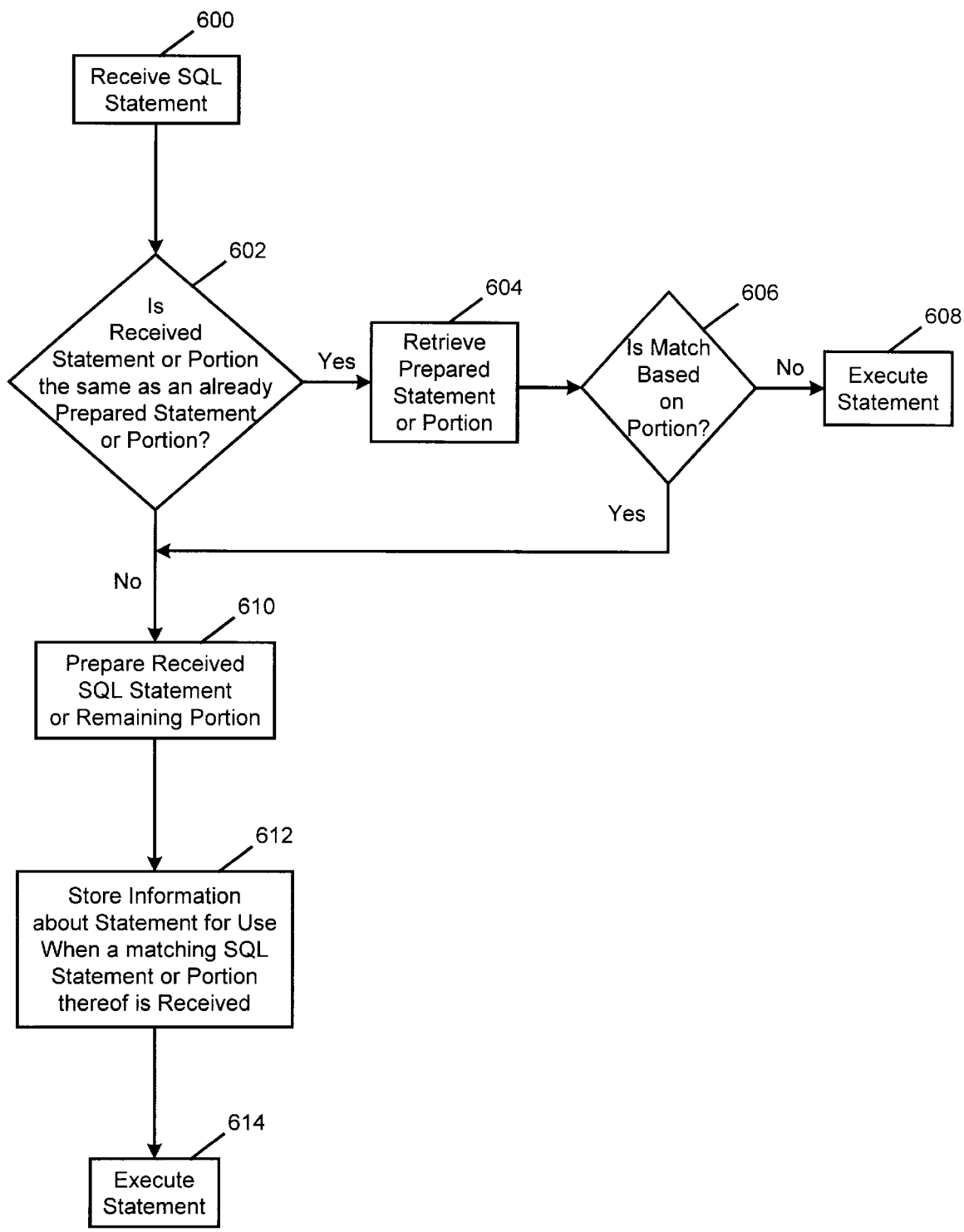
FIG. 6 is a flow chart that illustrates the steps performed by the live connection manager to process a SQL statement.

FIG. 6 is a flow chart that illustrates the steps performed by the live connection manager 110 to process a SQL statement. In Block 600, the live connection manager 110 receives a SQL statement. In Block 602, the live connection manager 110 determines whether the received SQL statement or portion thereof is the same as an already prepared SQL statement or portion thereof. That is, the live connection manager 110 compares the received SQL statement or portion thereof to stored statements or portions thereof, which reflect the textual form of previously processed statements or portions thereof. When the live connection manager 110 determines that the received SQL statement or portion thereof matches that of an already prepared SQL statement or portion thereof, the live connection manager 110 continues at Block 604, otherwise, the live connection manager 110 continues at Block 610.

In Block 604, the live connection manager 110 retrieves the prepared SQL statement or portion thereof. In Block 606, the live connection manager 110 determines whether the match is based on a portion. When the match is not based on a portion, the live connection manager continues at Block 608, otherwise the live connection manager continues at Block 610. In Block 608, the live connection manager 110 executes the statement. In Block 610, the live connection manager 110 prepares the received SQL statement or remaining portion thereof. In Block 612, the live connection manager 110 stores information about the statement for use when a matching SQL statement or portion thereof is received. In particular, the live connection manager 110 stores the textual form of the statement along with the prepared statement. In Block 614, the live connection manager 110 executes the statement.

SQL Statements with WHERE Clauses

A special example of the processing of similar portions of SQL statements will now be described. The live connection manager 110 provides additional efficiency by storing WHERE clause information. The following are sample WHERE clauses in a SQL statement:
SELECT * FROM EMPLOYEE WHERE Col1=Value 1;
SELECT * FROM EMPLOYEE WHERE Col1=Value 2;

The live connection manager 10 stores a "parameterized" SQL statement for each SQL statement containing a WHERE clause. That is, for the above statements, the live connection manager 110 stores "SELECT * FROM EMPLOYEE WHERE Col1=?", where the question mark represents a parameter that will be replaced with a value that could differ for different SQL statements.

Typically, a client 102 will access the database repeatedly with similar SQL statements that include different column values for columns in the WHERE clauses. Similar SQL statements would typically have the same preparation and description, with different columns of WHERE clauses being handled differently. When the live connection manager 110 receives a SQL statement, the live connection manager 110 will determine whether a stored prepared statement could be used to execute the received SQL statement. The live connection manager 110 makes the determination by comparing the textual form of already prepared statements with the received SQL statement.

When the live connection manager 110 determines that the received SQL statement matches the textual form of an already prepared statement, except that columns in the WHERE clauses have different values, the live connection manager 110 processes the column values of the columns of the WHERE clause into the parameters of the already prepared parameterized statement for use in accessing the database. On the other hand, when the live connection manager 10 determines that the columns of the WHERE clause are different from any parameterized statement, the live connection manager 110 prepares the SQL statement and does another database access.

The live connection manager 110 improves the performance in database access in the Internet environment significantly. In the application at the client 102, the column values represent the data most frequently changed in the columns of the WHERE clause. By processing columns of WHERE clauses by substituting different column values into the columns of already prepared statements, the live connection manager 110 improves the efficiency of processing SQL statements.

Figure 7:
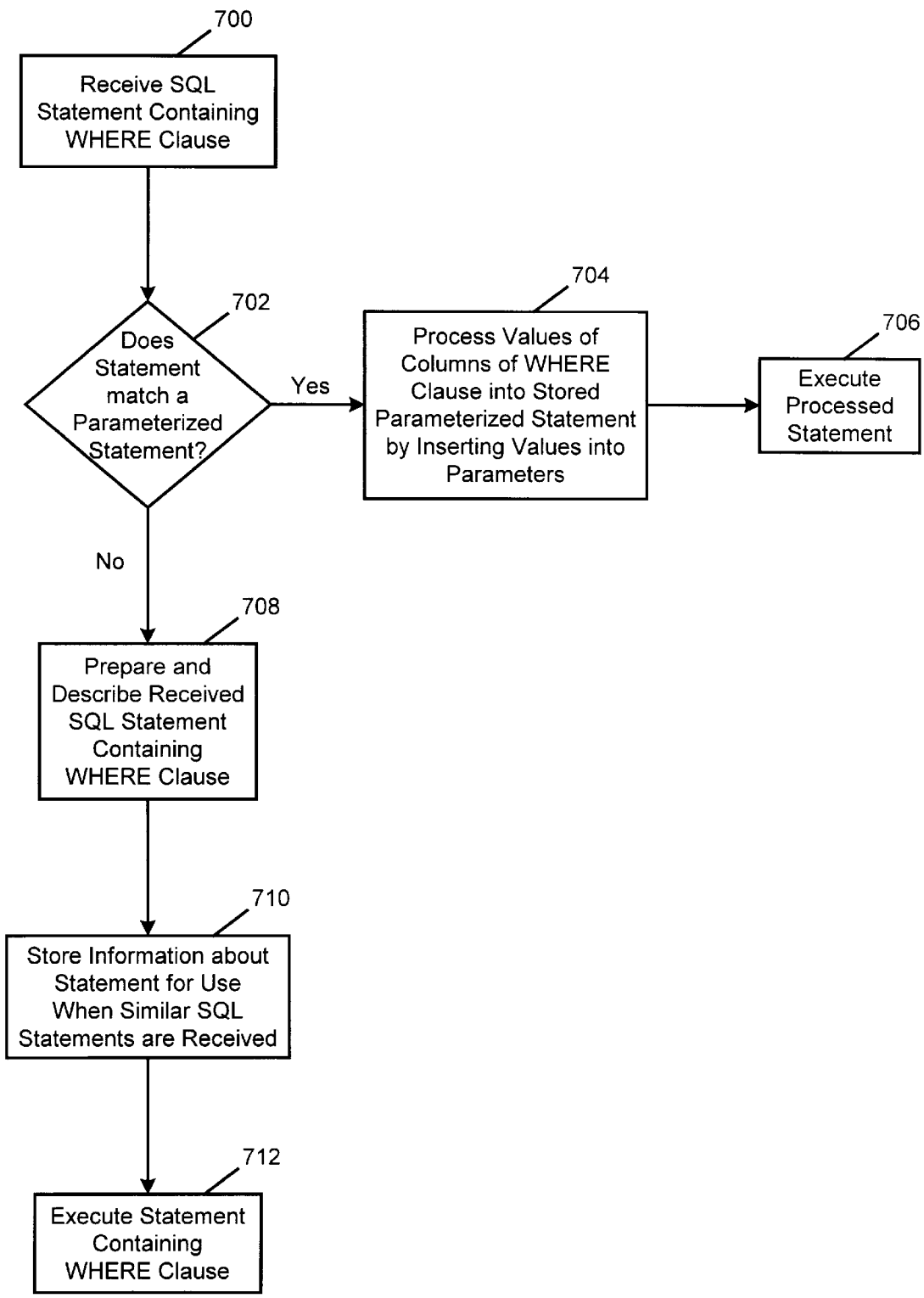
FIG. 7 is a flow chart that illustrates the steps performed by the live connection manager to process a SQL statement containing a WHERE clause.

FIG. 7 is a flow chart that illustrates the steps performed by the live connection manager 110 to process a SQL statement containing a WHERE clause. In Block 700, the live connection manager 110 receives a SQL statement containing a WHERE clause. In Block 702, the live connection manager 110 determines whether the received SQL statement matches a stored parameterized statement. When the live connection manager 110 determines that the received SQL statement matches a stored parameterized statement, the live connection manager 110 continues at Block 704, otherwise, the live connection manager 110 continues at Block 708.

In Block 704, the live connection manager 110 processes the column values of the columns of the WHERE clause into the stored parameterized statement by inserting column values into the parameters of the stored parameterized statement. In Block 706, the live connection manager 110 executes the processed statement. In Block 708, the live connection manager 110 prepares and describes the received SQL statement. In Block 710, the live connection manager 110 stores information about the statement and the WHERE clause for use when similar SQL statements are received. In Block 712, the live connection manager 110 executes the statement containing the WHERE clause.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented live connection manager. The present invention provides more efficient connections to databases across a network. Additionally, the present invention provides more efficient preparation of SQL statements. Furthermore, the present invention provides more efficient descriptions of SQL statement clauses.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing a statement in a computer, the statement being performed by the computer to retrieve data from a database stored on a data storage device connected to the computer, the method comprising the steps of:

receiving a first statement from another computer via a network;

preparing the first statement to create an application plan that describes how data is to be retrieved from the database;

receiving a second statement from another computer via the network;

comparing the received second statement or clause thereof to the first statement or clause thereof; and when the received second statement or clause thereof is the same as the first statement or clause thereof, processing the second statement or clause thereof by executing the application plan created for the first statement or clause thereof, without preparing the second statement or clause thereof.

2. The method of claim 1, further comprising the step of storing a textual form of the first statement or clause thereof along with the application plan.

3. The method of claim 2, further comprising the step of determining that the received second statement or clause thereof is the same as the first statement or clause thereof by comparing the textual form of the first statement or clause thereof with a textual form of the second statement or clause thereof.

4. The method of claim 1, further comprising the step of maintaining a table with preparation information.

5. The method of claim 4, further comprising the step of storing a handle identifying each prepared statement in the table.

6. The method of claim 1, wherein the first statement and the second statement each have at least one clause.

7. The method of claim 6, further comprising the step of maintaining a table with description information.

8. The method of claim 1, further comprising:

storing database connection information when accessing a database; and accessing the database multiple times using the stored database connection information.

9. The method of claim 8, further comprising the step of pre-connecting to one or more databases using configuration information.

10. The method of claim 8, further comprising the step of maintaining a table with connection information.

11. A method of executing a statement in a computer, the statement being performed by the computer to retrieve data from a database stored on a data storage device connected to the computer, the method comprising the steps of:

receiving a first statement from another computer via a network;

preparing the first statement to create a runtime structure comprising an application plan for executing the first statement;

describing a clause in the first statement; and receiving a second statement from another computer via the network, wherein the first statement and the second statement each have at least one clause; and when the received second statement or clause thereof is the same as the first statement or clause thereof, processing the second statement or clause thereof by executing the runtime structure created for the first statement or clause thereof; and when the received second statement has a clause having one or more columns that match one or more columns in the clause in the first statement, processing the clause in the second statement by executing the runtime structure created for the clause in the first statement using column values in the clause in the second statement.

12. The method of claim 11, further comprising:

storing database connection information when accessing a database; and accessing the database multiple times using the stored database connection information.

13. The method of claim 12, further comprising the step of pre-connecting to one or more databases using configuration information.

14. The method of claim 12, further comprising the step of maintaining a table with connection information.

15. An apparatus for executing a statement, comprising:

a computer having a data storage device connected thereto via a network, wherein the data storage device stores a database;

one or more computer programs, performed by the computer, for receiving a first statement from another computer via the network, preparing the first statement to create an application plan that describes how data is to be retrieved from the database, for receiving a second statement from another computer via the network, for comparing the received second statement or clause thereof to the first statement or clause thereof, and for, when the received second statement or clause thereof is the same as the first statement or clause thereof, processing the second statement or clause thereof by executing the application plan created for the first statement or clause thereof, without preparing the second statement or clause thereof.

16. The apparatus of claim 15, further comprising the means for storing a textual form of the first statement of clause thereof along with the application plan.

17. The apparatus of claim 16, further comprising the means for determining that the received second statement or clause thereof is the same as the first statement or clause thereof by comparing the textual form of the first statement or clause thereof with a textual form of the second statement or clause thereof.

18. The apparatus of claim 15, further comprising the means for maintaining a table with preparation information.

19. The apparatus of claim 18, further comprising the means for storing a handle identifying each prepared statement in the table.

20. The apparatus of claim 15, wherein the first statement and the second statement each have at least one clause.

21. The apparatus of claim 20, further comprising the means for maintaining a table with description information.

22. The apparatus of claim 15, further comprising:
means for storing database connection information when accessing a database; and
means for accessing the database multiple times using the stored database connection information.

23. The apparatus of claim 22, further comprising the means for pre-connecting to one or more databases using configuration information.

24. The apparatus of claim 22, further comprising the means for maintaining a table with connection information.

25. An apparatus for executing a statement, comprising:
a computer having a data storage device connected thereto via a network, wherein the data storage device stores a database;
one or more computer programs, performed by the computer, for receiving a first statement from another computer via the network, for preparing the first statement to create a runtime structure comprising an application plan for executing the first statement, for describing a clause in the first statement, for receiving a second statement from another computer via the network, wherein the first statement and the second statement each have at least one clause, and for, when the received second statement or clause thereof is the same as the first statement or clause thereof, processing the second statement or clause thereof by executing the runtime structure created for the first statement or clause thereof, and for, when the received second statement has a clause having one or more columns that match one or more columns in the clause in the first statement, processing the clause in the second statement by executing the runtime structure created for the clause in the first statement using column values in the clause in the second statement.

26. The apparatus of claim 25, further comprising:
means for storing database connection information when accessing a database; and
means for accessing the database multiple times using the stored database connection information.

27. The apparatus of claim 26, further comprising the means for pre-connecting to one or more databases using configuration information.

28. The apparatus of claim 26, further comprising the means for maintaining a table with connection information.

29. An article of manufacture comprising a computer program carrier readable by a computer and embodying one or more instructions executable by the computer to perform method steps for executing a statement, the statement being performed by the computer to retrieve data from a database stored in a data storage device connected to the computer, the method comprising the steps of:
receiving a first statement from another computer via a network;
preparing the first statement to create an application plan that describes how data is to be retrieved from the database;
receiving a second statement from another computer via the network;
comparing the received second statement or clause thereof to the first statement or clause thereof; and
when the received second statement or clause thereof is the same as the first statement or clause thereof, processing the second statement or clause thereof by executing the application plan created for the first statement or clause thereof, without preparing the second statement or clause thereof.

30. The method of claim 29, further comprising the step of storing a textual form of the first statement or clause thereof along with the application plan.

31. The method of claim 30, further comprising the step of determining that the received second statement or clause thereof is the same as the first statement or clause thereof by comparing the textual form of the first statement or clause thereof with a textual form of the second statement or clause thereof.

32. The method of claim 29, further comprising the step of maintaining a table with preparation information.

33. The method of claim 32, further comprising the step of storing a handle identifying each prepared statement in the table.

34. The method of claim 29, wherein the first statement and the second statement each have at least one clause.

35. The method of claim 34, further comprising the step of maintaining a table with description information.

36. The method of claim 29, further comprising:
storing database connection information when accessing a database; and
accessing the database multiple times using the stored database connection information.

37. The method of claim 36, further comprising the step of pre-connecting to one or more databases using configuration information.

38. The method of claim 36, further comprising the step of maintaining a table with connection information.

39. An article of manufacture comprising a computer program carrier readable by a computer and embodying one or more instructions executable by the computer to perform method steps for executing a statement, the statement being performed by the computer to retrieve data from a database stored in a data storage device connected to the computer, the method comprising the steps of:
receiving a first statement from another computer via a network;
preparing the first statement to create a runtime structure comprising an application plan for executing the first statement;
describing a clause in the first statement;
receiving a second statement from another computer via a network, wherein the first statement and the second statement each have at least one clause; and
when the received second statement or clause thereof is the same as the first statement or clause thereof, processing the second statement or clause thereof by executing the runtime structure created for the first statement or clause thereof; and
when the received second statement has a clause having one or more columns that match one or more columns in the clause in the first statement, processing the clause in the second statement by executing the runtime structure created for the clause in the first statement using column values in the clause in the second statement.

40. The method of claim 39, further comprising:

storing database connection information when accessing a database; and accessing the database multiple times using the stored database connection information.

41. The method of claim 40, further comprising the step of pre-connecting to one or more databases using configuration information.

42. The method of claim 40, further comprising the step of maintaining a table with connection information.

* * * * *